United States Patent [19]

Camiade et al.

[11] Patent Number: 5,349,356
[45] Date of Patent: Sep. 20, 1994

[54] SIMULTANEOUS DATA TRANSMISSION AND RECEPTION SYSTEM USING MICROWAVES

[75] Inventors: Marc Camiade, Antony; Véronique Serru, Paris; Dominique Geffroy, Courcouronnes, all of France

[73] Assignee: Thomson Composants Microondes, Puteaux, France

[21] Appl. No.: 115,716

[22] Filed: Sep. 3, 1993

Related U.S. Application Data

[63] Continuation of Ser. No. 933,308, Aug. 21, 1992, abandoned.

[30] Foreign Application Priority Data

Aug. 23, 1991 [FR] France ................... 91 10570

[51] Int. Cl.⁵ .............................................. G01S 13/80
[52] U.S. Cl. ....................................... 342/50; 342/188
[58] Field of Search ............................ 342/42, 50, 188

[56] References Cited

U.S. PATENT DOCUMENTS

| | | | |
|---|---|---|---|
| 4,156,874 | 5/1979 | Kopis | 342/71 |
| 4,390,880 | 6/1983 | Henoch | 342/50 |
| 5,021,790 | 6/1991 | Ohta et al. | 342/188 X |

FOREIGN PATENT DOCUMENTS

| | | |
|---|---|---|
| 2257095 | 8/1975 | France . |
| 54-121693 | 9/1979 | Japan . |
| 2219175 | 11/1989 | United Kingdom . |
| WO8801062 | 2/1988 | World Int. Prop. O. . |
| WO9010200 | 9/1990 | World Int. Prop. O. . |

*Primary Examiner*—John B. Sotomayor
*Attorney, Agent, or Firm*—Oblon, Spivak, McClelland, Maier & Neustadt

[57] ABSTRACT

A system including a first station (1) known as a beacon and at least one second station (2) known as a badge, each station having a transmission channel with an antenna and a reception channel with an antenna.

To allow multiplex exchanges, using simultaneous transmission and reception, the two antennas (6, 11) (13, 15) in any given station are decoupled by cross-polarization but antennas which communicate with each other (6, 13) (11, 15) have compatible polarization.

Applications to identification systems using microwave transmission.

11 Claims, 2 Drawing Sheets

SIMULTANEOUS DATA TRANSMISSION AND RECEPTION SYSTEM USING MICROWAVES

This application is a continuation of application Ser. No. 07/933,308, filed on Aug. 21, 1992, now abandoned.

BACKGROUND OF THE INVENTION

This invention is a system to transmit data by modulating-demodulating a microwave to obtain two-way communication between a fixed station, known as a beacon or reader, and a mobile station, known as a badge or transponder. More precisely, the invention applies to the system architecture which is organized to allow simultaneous data exchanges (full duplex) instead of alternated exchanges (half duplex) between a beacon and at least one badge. The microwave range allows the beacon to interrogate a large number of badges with no collisions between the streams of data exchange.

This type of data exchange is used to monitor moving bodies, for example to identify trucks on a track, cars at a toll barrier or pedestrians at the entrance to a building; in these cases, the badges move in front of a stationary reader. Nonetheless, when searching for an item, the badges may be fixed, mounted on an item sought, and the reader then moves until it finds the item sought; by convention, to make the explanation of the invention clearer, the terms "reader" and "responder-badge" or "transponder" will still be used, even if the reader is mobile and the badge fixed.

DESCRIPTION OF THE PRIOR ART

Microwave data exchange systems known to be prior art use badges similar to credit cards which operate on half duplex, the reason being that they are designed to be as simple as possible for use by the "consumer public" and also have only one antenna in the badge.

The general arrangement of a microwave data exchange system complying with the prior art is relatively simple, it is described in French patent applications numbers 90-14289, -290, -291, and -292 filed by the applicant on Nov. 16, 1990.

A mobile station, or badge, comprises a microwave section and a data processing and power supply section. The exchanges between these two sections are those required for modulation-demodulation and transmission reception of commands.

A fixed station, or beacon, comprises a microwave source, a microwave section, a data processing section and a computer to manage all radio-electric exchanges with the badges via the antennas in the badge and beacon or reader.

The applications for patents mentioned above mainly aim at optimizing the energy system in the badge and describe different types of badge modem (modulator-demodulator) organization and operation designed to save energy in the badge. A badge is like a credit card and must use very little energy since it is powered by small batteries, known as "buttons" or by amorphous silicon photo cells or by the energy carried in a microwave.

In addition, for reasons of economy and to simplify manufacture, the two system terminals, i.e. the beacon and badge, operate with only one antenna each. In fact, a microwave antenna printed onto the badge substrate is very simple, compact and inexpensive. It is a square with an approx. 2 cm edge (depending on frequency). Providing two antennas, one for transmission and the other for reception, therefore represents only a very slight loss in terms of badge surface area absorbed while including two antennas in the beacon represents no space penalty at all since all the difficulties encountered in a data exchange system originate from the badge: the need for compactness and low power consumption.

SUMMARY OF THE INVENTION

The two types of stations in a microwave data exchange system complying with the invention, that is the beacon and the badges, both have two channels in parallel, each with an antenna, one channel being reserved for transmission and the other for reception; this therefore allows simultaneous exchanges to take place. The original feature of the system, other than its structure resulting from the carrier frequencies—10 to 20 GHz—is the polarization of the antennas: the two antennas in each station are cross-polarized while the two antennas which communicate—one in the beacon and one in the badge—have the same polarization or compatible polarizations. Cross-polarization provides the maximum decoupling between two channels operating simultaneously; the coupling is 20 to 40 dB, depending on the antenna design.

More precisely, the invention is a system to exchange data in the form of microwaves, between a first station known as a beacon (1) and at least one second station known as a badge (2), each carrying a pair of antennas (6, 11) (13, 15), this system operating in the write and read mode simultaneously and comprising:
- a channel to allow beacon (1) to write data to badge (2), the channel comprising a beacon (1) transmission antenna (6) and a badge (2) reception antenna (13), these two antennas (6, 13) being compatibly polarized,
- a channel to allow beacon (1) to read data recorded on badge (2), the channel including a transmission-reception antenna (11) in the beacon (1) and a transmission-reception antenna (15) in badge (2), this second pair of antennas (11, 15) being compatibly polarized,
- the polarization of the first antenna pair (6, 13) crossing the polarization of the second antenna pair (11, 15).

BRIEF DESCRIPTION OF THE DRAWINGS

The invention will be better understood and other advantages will become clear upon reading the following description of an embodiment and referring to the appended figures in which:

FIG. 1 is a functional diagram of the system in its simplest form: one beacon or reader 1, and at least one badge or responder or transponder 2.

Figure 1:
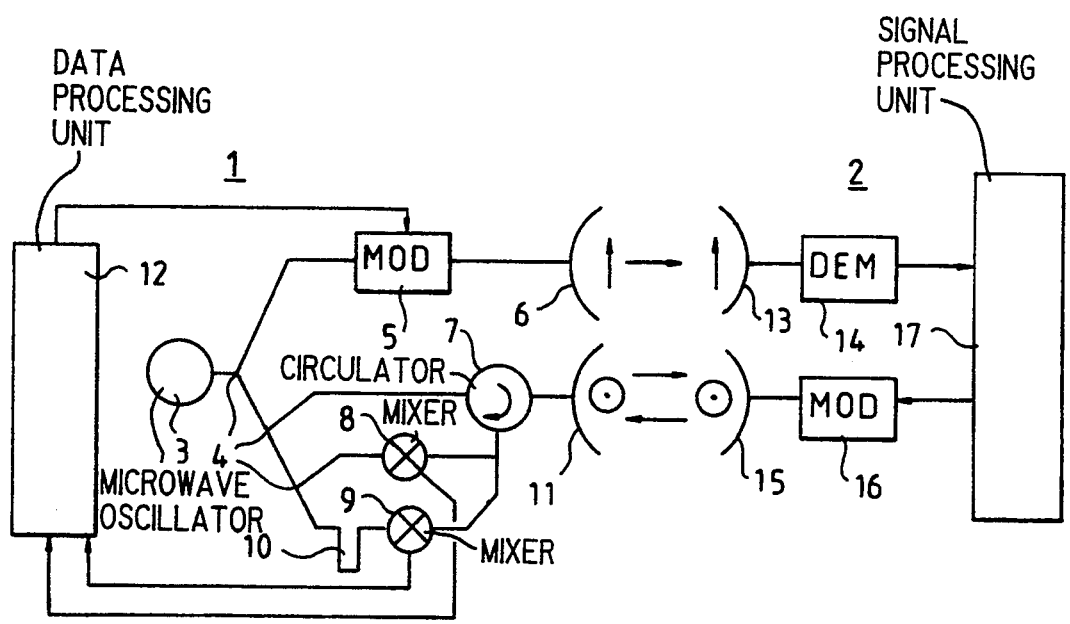
FIG. 1 is a functional electric block diagram of a system according to the invention.

Beacon 1 comprises at least:

A microwave oscillator source 3,

Wilkinson-type power dividers or couplers 4 to supply power to the transmission and reception channels, Circuit 5 which modulates the microwave carrier and is connected to a transmission antenna 6, A reception circuit comprising a circulator 7 and two mixers 8 and 9 held in quadrature by delay line 10, this circuit being connected to a reception antenna 11.

Both antennas 6 and 11 in the beacon are polarized but with two different types of polarization, for example with right-handed circular polarization and the other with left-handed circular polarization, or one with vertical linear polarization and the other with horizontal linear polarization; it is this second case that is shown in FIG. 1.

The advantage of cross-polarizing the two antennas is that the decoupling obtained (20 to 40 dB depending on the design) allows simultaneous transmission and reception with no cross-talk between the channels.

Finally, the beacon includes a data processing, power supply and interface assembly 12 which manages beacon transmission and reception.

Badge 2 comprises at least:

A reception antenna 13 connected to circuit 14 which demodulates the microwave signal transmitted by antenna 6 in beacon 1, A transmission antenna 15 connected to circuit 16 which modulates a microwave carrier, A signal processing unit 17, connected to two circuits, 14 and 16, in that modem. When the beacon transmits an interrogation signal to the badge, this processing unit provides the power supply for the circuits, and manages the circuits and identification memories.

As in the beacon 1, antennas 13 and 15 in badge 2 are cross-polarized to obtain the maximum decoupling between them but the polarization of each is chosen to ensure compatibility between the beacon and badge antennas which communicate with each other. Different types of compatible polarization will be discussed later.

The electrical diagrams for the various components of the beacon and badge are not detailed here: they are either known in the prior art and commercially available or described in the patent applications mentioned previously. The description of the system operation will make its architecture easier to understand.

In the write, or interrogation, mode, data is exchanged between a first pair of compatibly polarized antennas. The beacon processing unit 12 triggers the transmission channel modulator 5 and antenna 6 transmits the data at the carrier frequency. The badge receives this data via antenna 13, circuit 14 demodulates it and transmits it to the data processing unit 17.

In the read, or reply, mode, a second pair of compatible antennas, different from the first pair, is used. The beacon transmits an unmodulated microwave carrier via its reception channel and its antenna 11. The badge receives this carrier via its antenna 15, modulator 16 modulates it to introduce data or a reply, and retransmits it via antenna 15. The homodyne receiver 7 to 10, coupled to the beacon reception channel, demodulates the signal.

The signal can be modulated in the badge in different ways, but varying the reflective coefficient of antenna 15 is found to be a very appropriate method due to the special features of the system and particularly due to the characteristics of the power supply for a badge of the "credit card" format.

The two operating modes, write and read, are decoupled by the cross-polarization of the two sets of antennas and, therefore, the system can operate in full duplex, simultaneously transmitting and receiving on the two channels.

The overall modulation method should preferably be chosen to ensure that the decoupling between the transmission and reception channels (20 to 40 dB) is compatible with operation. It is possible, for example, to use widely differing modulating frequencies for read and write.

Figure 2:
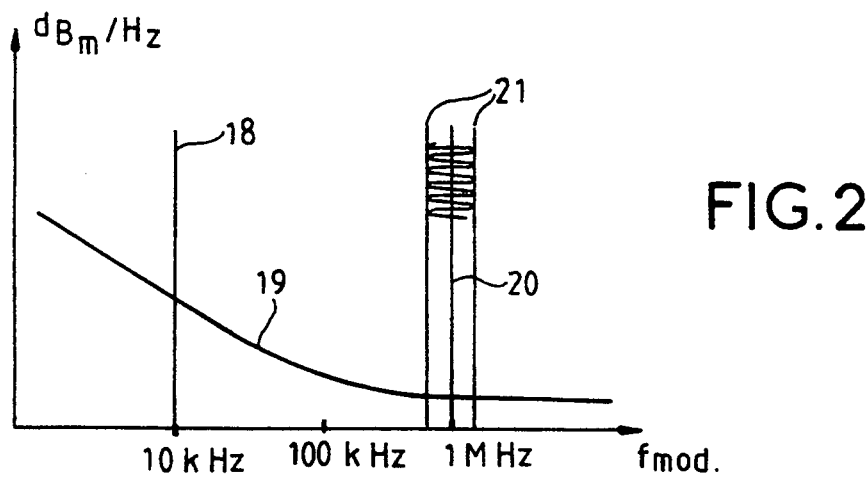
FIG. 2 is the relevant frequency diagram if only one sub-carrier is used.
Figure 3:
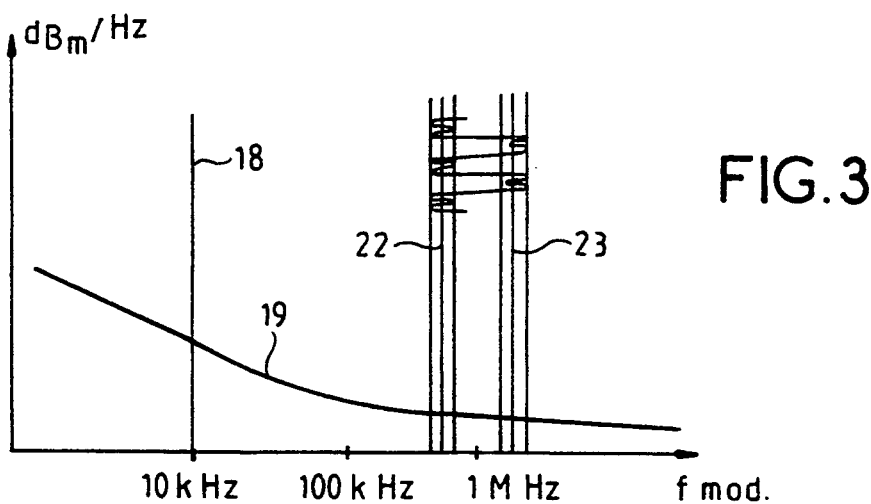
FIG. 3 is the relevant frequency diagram when two sub-carriers are used.
Figure 4:
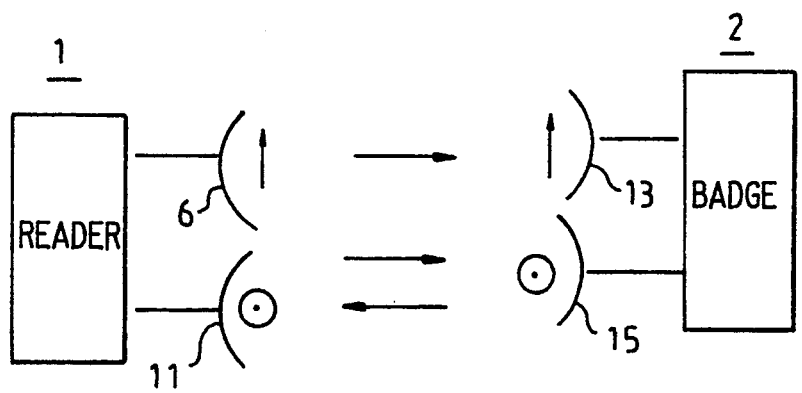
FIGS. 4 to 7 are examples of cross-polarization possibilities.
Figure 5:
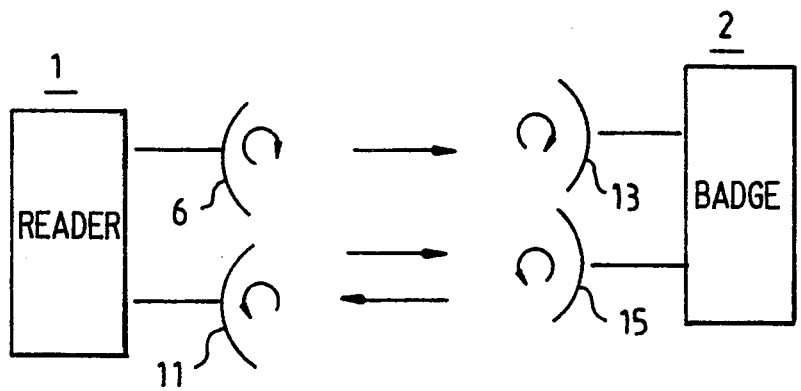
Figure 6:
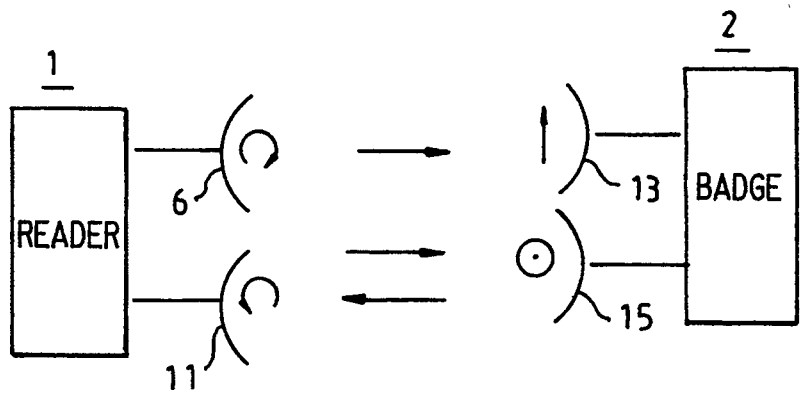

FIGS. 2 and 3 are two examples showing the modulating frequency along the abscissa and the power along the ordinate axes.

Amplitude modulation is used in the write mode. In this transmission direction there are no noise problems due to amplitude modulation since the levels received by the badge are approx. $-30$ dBm: the transmission rate frequency, i.e. a few dozen kilohertz (the straight line 18 in FIGS. 2 and 3), can then be used directly for modulation. It is preferable to use a quasi-sinusoidal modulator 5 to avoid generating modulation signal harmonics.

In the read mode, the microwave carrier can be amplitude or phase modulated. However, there are two basic reasons a sub-carrier should be used.

The first reason is that it is essential to operate at a modulation frequency very different from that used for the write mode so that any leaks from the write channel can be filtered out.

The second reason is the desirability of reducing the noise, proportional to $1/f$, caused by the system microwave components. At the frequencies used—several gigahertz to several dozen gigahertz—GaAs transistors are employed and these are noisier than Si components: their noise curve 19 is shown in FIGS. 2 and 3. If the power to be detected is approx. $-80$ dBm, the modulation sub-carrier frequencies are in the megahertz range since the $1/f$ noise is less.

There are several ways of using a sub-carrier. FIG. 2 illustrates a first way, where sub-carrier 20, whose frequency is approx. 1 megahertz, has two side bands 21; this gives on/off modulation between the two side bands at the modulation rate. The signal is received in the badge by a quadratic detector.

A second method, shown in FIG. 3, is to use two sub-carriers 22 and 23, with similar frequencies, for example 1 and 1.2 MHz, and then switch these at the modulation rate. This gives "pseudo FSK" (Frequency Shift Keying) modulation. The detector is a phase-locked oscillator synchronized with the sub-carriers. The third possibility is to apply BPSK (Bi Phase Shift Keying) to the sub-carrier i.e. to trip phase skips at the modulation rate.

FIGS. 4 to 7 illustrate a few possibilities available to decouple the transmission and reception channels. The conventional signs are used to indicate polarization in these figures.

Figure 7:
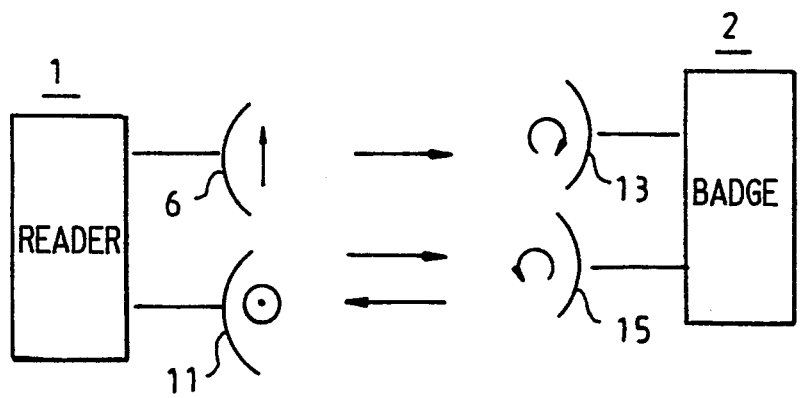

It is possible to use:

Crossed linear polarized antennas on the beacon and badge (FIG. 4),

Crossed or reversed circular polarized antennas on the beacon and badge (FIG. 5), Reversed circular polarized antennas on the beacon and crossed linear polarized antennas on the badge (FIG. 6), Crossed linear polarized antennas on the beacon and reversed circular polarized antennas on the badge (FIG. 7).

The combinations represented above are not exhaustive: it would be possible to at least double the number by interchanging the transmission channel (first pair of antennas: 6+13) and reception channels (second pair of antennas: 11+15), and, moreover, depending on the case, by reversing the pairing. For example, in FIG. 7, antenna 6 communicates with right-handed polarized antenna 13 but could also communicate with a left-handed polarized antenna.

If circular polarization is paired with linear polarization, the operation of the system is correct regardless of how the badge is rotated about the center line between the beacon and badge.

As for the circuits, no details of antenna polarization methods are given here since they are well known in the prior art and various types of polarized antennas can be used to construct a system with polarized antennas which allow simultaneous transmission and reception.

What is claimed is:

1. A system to exchange data in the form of microwaves, between a first station and at least one second station, each of said first and second stations including a pair of antennas, said data exchange system operating in the write and read mode simultaneously and comprising:

a first channel to allow said first station to write data to said second station, the first channel comprising a first transmission antenna included in said first station and a first reception antenna included in said second station, said first transmission and reception antennas being compatibly polarized, a second channel to allow said first station to read data recorded in said second station simultaneously with the writing of data from said first station to said second station, the second channel including a second transmission-reception antenna in the first station an a second transmission-reception antenna in the second station, said second pair of transmission-reception antennas being compatibly polarized, and wherein the polarization of the first transmission and reception antenna pair included in said first channel crosses the polarization of the transmission-reception antenna pair included in said second channel.

2. A system as described in claim 1, in which the antennas included in said first station have linear polarization and the antennas included in said second station have linear polarization crossed with the polarization of the antennas of the first station.

3. A system as described in claim 1, in which the antennas of the first station have circular polarization and the antennas of the second station have circular polarization which is opposite to that of the antennas included in the first station.

4. A system as described in claim 1, in which the antennas included in the first station have crossed linear polarization and the antennas of the second station have reversed circular polarization.

5. A system as described in claim 1, in which the antennas of the first station have reversed circular polarization and the antennas of the second station have crossed linear polarization.

6. The system according to claim 1, wherein said first station comprises a reception circuit including a circulator and two mixing circuits held in quadrature by a delay line.

7. The system according to claim 1, wherein said transmission antenna in said second station is modulated by varying the reflective coefficient thereof.

8. The system according to claim 1, wherein the write and read modes of transmission are decoupled by a cross-polarization of the two pairs of transmission-reception antennas and the system operates in the full duplex mode.

9. The system according to claim 8, wherein amplitude modulation is used in the write mode.

10. The system according to claim 9, wherein a quasi-sinusoidal modulator is used for said amplitude modulation.

11. The system according to claim 8, wherein amplitude or phase modulation is used in the read mode.

* * * * *